(12) United States Patent
de Oliveira et al.

(10) Patent No.: US 12,518,233 B2
(45) Date of Patent: Jan. 6, 2026

(54) NORMALIZING PERFORMANCE DATA ACROSS INDUSTRIAL VEHICLES

(71) Applicant: Crown Equipment Corporation, New Bremen, OH (US)

(72) Inventors: Sergio Schulte de Oliveira, Troy, OH (US); Benjamin J. Purrenhage, Kalamazoo, MI (US); Philip W. Swift, Dayton, OH (US)

(73) Assignee: Crown Equipment Corporation, New Bremen, OH (US)

( * ) Notice: Subject to any disclaimer, the term of this patent is extended or adjusted under 35 U.S.C. 154(b) by 21 days.

(21) Appl. No.: 17/143,801

(22) Filed: Jan. 7, 2021

(65) Prior Publication Data

US 2021/0125122 A1    Apr. 29, 2021

Related U.S. Application Data

(63) Continuation of application No. 14/212,719, filed on Mar. 14, 2014, now abandoned.

(Continued)

(51) Int. Cl.
  *G06Q 10/0639* (2023.01)
  *G07C 5/00* (2006.01)
  *G07C 5/08* (2006.01)

(52) U.S. Cl.
  CPC ......... *G06Q 10/0639* (2013.01); *G07C 5/008* (2013.01); *G07C 5/08* (2013.01)

(58) Field of Classification Search
  CPC .... G06Q 10/00; G06Q 10/0639; G06Q 30/02; G06Q 30/0282; G06F 17/18;

(Continued)

(56) References Cited

U.S. PATENT DOCUMENTS

| 6,952,680 | B1 | 10/2005 | Melby et al. |
| 7,809,601 | B2 | 10/2010 | Shaya et al. |

(Continued)

FOREIGN PATENT DOCUMENTS

| CN | 1642768 A | 7/2005 |
| CN | 101028912 A | 9/2007 |

(Continued)

OTHER PUBLICATIONS

Estanjini et al., Optimizing Warehouse Forklift Dispatching Using a Sensor Network and Stochastic Learning, Sep. 16, 2011, IEEE Transactions on Industrial Informatics, vol. 7, Issue 3, pp. 476-486 (Year: 2011).*

(Continued)

*Primary Examiner* — Robert D Rines
(74) *Attorney, Agent, or Firm* — Stevens & Showalter LLP

(57) ABSTRACT

Approaches are provided for normalizing performance data for the operation of industrial vehicles. The approaches comprise categorizing operations of an industrial vehicle into distinct, measureable activities. The approaches further comprise measuring the actual usage of the industrial vehicle as a function of each category of operation and wirelessly transmitting that measured usage to a remote server. The approaches also comprise associating for each category, a weighted impact on the work performed by each category as a function of energy consumed in performing that work.

20 Claims, 9 Drawing Sheets

Related U.S. Application Data

(60) Provisional application No. 61/800,071, filed on Mar. 15, 2013.

(58) Field of Classification Search
CPC . B60W 20/10; B60L 2200/40; B60L 2260/54; B60L 58/12; B60L 50/61; G07C 5/00; G07C 5/0808; G07C 5/0841; G07C 5/12; G07C 5/008
See application file for complete search history.

(56) References Cited

U.S. PATENT DOCUMENTS

| | | | | |
|---|---|---|---|---|
| 2005/0258154 | A1* | 11/2005 | Blankenship | B23K 9/0953 219/130.01 |
| 2007/0239292 | A1 | 10/2007 | Ehrman et al. | |
| 2008/0147265 | A1 | 6/2008 | Breed | |
| 2008/0154712 | A1 | 6/2008 | Wellman | |
| 2008/0167245 | A1 | 7/2008 | Nihei et al. | |
| 2009/0051322 | A1* | 2/2009 | Kubota | B60W 10/06 320/134 |
| 2009/0174538 | A1* | 7/2009 | Shibata | B60L 50/16 340/438 |
| 2009/0299581 | A1* | 12/2009 | Price | F02D 41/021 701/50 |
| 2010/0094496 | A1 | 4/2010 | Hershkovitz et al. | |
| 2011/0040440 | A1 | 2/2011 | de Oliveira et al. | |
| 2011/0137502 | A1* | 6/2011 | Kato | B60W 10/26 180/65.265 |
| 2011/0191135 | A1 | 8/2011 | Williams et al. | |
| 2011/0270486 | A1* | 11/2011 | Stevens | F02D 19/026 701/31.4 |
| 2011/0313608 | A1* | 12/2011 | Izumi | B66F 9/24 701/22 |
| 2012/0239261 | A1 | 9/2012 | Medwin et al. | |
| 2013/0175975 | A1* | 7/2013 | Shinozaki | H02J 1/10 320/106 |
| 2014/0214267 | A1* | 7/2014 | Sellschopp | G06F 17/00 701/34.2 |
| 2014/0232112 | A1* | 8/2014 | Wada | B60L 50/10 290/17 |
| 2014/0278823 | A1 | 9/2014 | de Oliveira et al. | |
| 2014/0337429 | A1 | 11/2014 | Asenjo et al. | |
| 2015/0066837 | A1 | 3/2015 | Twarog et al. | |
| 2016/0319515 | A1* | 11/2016 | Ito | E02F 9/2235 |

FOREIGN PATENT DOCUMENTS

| | | |
|---|---|---|
| CN | 101045517 A | 10/2007 |
| CN | 102483836 A | 5/2012 |
| WO | 2011036495 A2 | 3/2011 |

OTHER PUBLICATIONS

Grant of Patent dated Aug. 18, 2021; Korean Application No. 10-2015-7029119; Korean Intellectual Property Office.
First Search dated Jul. 26, 2016; Chinese Application No. 201480012536.3; The State Intellectual Property Office of the People's Republic of China.
Notification to Grant Patent Right for Invention dated Dec. 31, 2019; Chinese Application No. 201480012536.3; The State Intellectual Property Office of the People's Republic of China.
Notice of Final Rejection dated Jun. 4, 2021; Korean Application No. 10-2015-7029119; Korean Intellectual Property Office.
Office Action dated Jun. 3, 2021; Canadian Application No. 2,900,352; Canadian Intellectual Property Office.
"Optimizing Warehouse Forklift Dispatching Using a Sensor Network and Stochastic Learning"; IEEE Transactions on Industrial Informatics; vol. 7, No. 3; Aug. 2011; pp. 476-486.
Forklift Fleet and Operator Management: Optimizing Return Through Phased Implementation "; Crown Equipment Corporation"; 2011; pp. 1-9; New Bremen, Ohio.
Baharlou, Simin; International Preliminary Report on Patentability; International Application No. PCT/US2014/028567; Sep. 15, 2015; The International Bureau of WIPO; Geneva, Switzerland.
Miltgen, Eric; International Search Report and Written Opinion of the International Searching Authority; International Application No. PCT/US2014/028567; Aug. 4, 2014; European Patent Office; Rijswijk, Netherlands.
Hwang, Yoo-Jin; Notice of Preliminary Rejection; Korean Patent Application No. 10-2015-7029119; May 25, 2020; Korean Intellectual Property Office; Korea.
Meng, Yu; First Office Action; Chinese Patent Application No. CN 201480012536.3; Aug. 3, 2016; State Intellectual Property Office of the People's Republic of China; Beijing, China.
Meng, Yu; Third Office Action; Chinese Patent Application No. 201480012536.3; Oct. 11, 2017; State Intellectual Property Office of the People's Republic of China; Beijing, China.
Meng, Yu; Second Office Action; Chinese Patent Application No. CN 201480012536.3; Apr. 5, 2017; State Intellectual Property Office of the People's Republic of China; Beijing, China.
Meng, Yu; Rejection Decision; Chinese Patent Application No. 201480012536.3; Apr. 16, 2018; State Intellectual Property Office of the People's Republic of China; Beijing, China.
Badr, Hniene; Examination Report; EPO Application No. 14723562.6; Aug. 13, 2019; European Patent Office; Rijswijk, Netherlands.
Meng, Yu; Fifth Office Action; Chinese Patent Application No. 201480012536.3; Jun. 27, 2019; State Intellectual Property Office of the People's Republic of China; Beijing, China.
Meng, Yu; Fourth Office Action; Chinese Patent Application No. 201480012536.3; Jan. 2, 2019; State Intellectual Property Office of the People's Republic of China; Beijing, China.
Merriam-Webster Online Dictionary; https://www.merriam-webster.com/dictionary/normalize; retrieved Jan. 3, 2020.
Rines, Robert D.; Final Office Action; U.S. Appl. No. 14/212,719, filed Oct. 7, 2020; United State Patent and Trademark Office; Alexandria, Virginia.
Rines, Robert D.; Office Action; U.S. Appl. No. 14/212,719, filed Jun. 11, 2020; United States Patent and Trademark Office; Alexandria, Virginia.
Behnckle, Christine M.; Decision on Appeal; U.S. Appl. No. 14/212,719, filed Jan. 15, 2020; United States Patent and Trademark Office; Alexandria, Virginia.
Vizvary, Gerald C.; Examiner's Answer to Appeal Brief; U.S. Appl. No. 14/212,719, filed May 3, 2018; United States Patent and Trademark Office; Alexandria, Virginia.
Vizvary, Gerald C.; Final Office Action; U.S. Appl. No. 14/212,719; filed Jul. 3, 2017; United States Patent and Trademark Office; Alexandria, Virginia.
Vizvary, Gerald C.; Office Action; U.S. Appl. No. 14/212,719, filed Dec. 30, 2016; United States Patent and Trademark Office; Alexandria, Virginia.
Vizvary, Gerald C.; Requirement for Restriction/Election; U.S. Appl. No. 14/212,719, filed Oct. 11, 2016; United States Patent and Trademark Office; Alexandria, Virginia.
Choi, Richin; Official Action and Examination Search Report; Canadian Application No. 2,900,352; Sep. 23, 2020; Canadian Intellectual Property Office; Gatineau, Quebec, Canada.
Notice of Reason for Refusal; Korean Patent Application No. 10-2015-7029119; Nov. 19, 2020; Korean Intellectual Property Office; Korea.
Choi, Richin; Official Action and Examination Search Report; Canadian Application No. 2,900,352; Sep. 17, 2019; Canadian Intellectual Property Office; Gatineau, Quebec, Canada.
Barisic, Ivanka; Examination Report No. 1; Australian Patent Application No. 2014227692; May 2, 2017; Patent Office; Australia.
Guinea, William; Examination Report No. 1; Australian Patent Application No. 2018203050; May 21, 2019; Patent Office; Australia.
Guinea, William; Examination Report No. 2; Australian Patent Application No. 2014227692; Dec. 6, 2017; Patent Office; Australia.
Guinea, William; Examination Report No. 2; Australian Patent Application No. 2018203050; May 1, 2020; Australian Patent Office; Australia.

(56) References Cited

OTHER PUBLICATIONS

Guinea, William; Examination Report No. 3; Australian Patent Application No. 2018203050; May 14, 2020; Australian Patent Office; Australia.
Guinea, William; Examination Report No. 3; Australian Patent Application No. 2014227692; May 1, 2018; Australian Patent Office; Australia.

* cited by examiner

NORMALIZING PERFORMANCE DATA ACROSS INDUSTRIAL VEHICLES

CROSS REFERENCE TO RELATED APPLICATIONS

This application is a continuation of U.S. patent application Ser. No. 14/212,719, filed Mar. 14, 2014, entitled NORMALIZING PERFORMANCE DATA ACROSS INDUSTRIAL VEHICLES, which claims the benefit of U.S. Provisional Patent Application Ser. No. 61/800,071, filed Mar. 15, 2013, entitled NORMALIZING PERFORMANCE DATA ACROSS INDUSTRIAL VEHICLES, the disclosures of which are hereby incorporated by reference.

BACKGROUND

The present disclosure relates in general to measurements of industrial vehicle usage, and in particular, to the measurement and normalization of industrial vehicle work for comparison and analysis.

Wireless strategies may be deployed by business operations, including distributors, retail stores, manufacturers, etc., to improve the efficiency and accuracy of business operations. Wireless strategies may also be deployed by such business operations to avoid the insidious effects of constantly increasing labor and logistics costs. In a typical wireless implementation, workers are linked to a management system executing on a corresponding computer enterprise via a mobile wireless transceiver. The wireless transceiver may be used as an interface to the management system to direct workers in their tasks, e.g., by instructing workers where and/or how to pick, pack, put away, move, stage, process or otherwise manipulate the items within the operator's facility. The wireless transceiver may also be used in conjunction with a suitable input device to scan, sense or otherwise read tags, labels or other identifiers to track the movement of designated items within the facility.

In order to move items about the operator's facility, workers often utilize industrial vehicles, including for example, forklift trucks, hand and motor driven pallet trucks, etc. However, disruptions in the operation of such materials handling vehicles impact the ability of the management system and corresponding wireless strategy to obtain peak operating efficiency. Moreover, conventional enterprise software, including corresponding management systems do not account for the industrial vehicles required to perform the work required to move the items about the operator's facility.

BRIEF SUMMARY

According to aspects of the present disclosure, a system for measuring industrial vehicle usage, comprises a transceiver, a sensor, a battery monitor, and an information linking device. The transceiver is provided on an industrial vehicle and communicates over a wireless connection to a remote server. The sensor is coupled to a battery of the industrial vehicle to measure a battery characteristic. Correspondingly, the battery monitor interfaces with the sensor to sample energy consumed by the battery as the industrial vehicle is operated. The information processing device is also provided on the industrial vehicle. The information processing device is configured to exchange electronic data with the transceiver and with the battery monitor. Moreover, the information processing device is further configured to exchange electronic data with a vehicle controller on the industrial vehicle based upon communication across a vehicle network bus.

More particularly, the information processing device measures usage of the industrial vehicle by processing program code to communicate across the vehicle network bus of the industrial vehicle with the vehicle controller to extract vehicle usage data that maps to a distinct, measurable activity performed by the industrial vehicle. Here, the vehicle usage data is stored in memory. The information processing device also communicates with the battery monitor to receive discharge information, where the discharge information characterizes sampled energy consumed by the battery while the industrial vehicle was engaged in the distinct, measurable activity. Still further, the information processing device communicates with the transceiver to convey at least one of the vehicle usage data and the discharge information to the remote server. Also, a display outputs a weighted impact on work performed by the industrial vehicle based upon the extracted vehicle usage data and the corresponding discharge information, where the weighted impact on work is expressed as a measure of power expended per unit of time.

According to additional aspects of the present disclosure, a method of normalizing industrial vehicle performance data is provided. The method comprises establishing at least one category associated with a distinct, measureable activity capable of being performed by an industrial vehicle. Each category is characterized by at least one parameter. The method also comprises electronically collecting data from an industrial vehicle corresponding to actual vehicle use, where the collected data satisfies the parameter defining each category. The method still further comprises accumulating the collected data according to each category. The method yet further comprises associating for each category, a weighted impact on work performed by that category as a function of energy consumed in performing that work. The method also comprises providing an indication of the work performed by the industrial vehicle based upon the accumulated data.

According to further aspects of the present disclosure, a method of normalizing performance data for the operation of industrial vehicles is provided. The method produces a universal measurement for a unit of work, providing a way of measuring and evaluating the ability of an industrial vehicle to perform work. The universal measurement also allows a way of comparing industrial vehicles against each other, using a standard unit of measure.

The method comprises measuring the horizontal movement of an industrial vehicle over a pre-determined interval and measuring the vertical movement of the forks of the industrial vehicle over the pre-determined interval. The method also comprises summing the horizontal movement and the vertical movement to a summed total. Still further, the method comprises deriving a work unit by dividing the summed total by a standardizing factor. For instance, the work unit may be defined as power expended per unit of time, measured in kilowatt hours.

According to yet further aspects of the present disclosure, a method of normalizing performance data of industrial vehicles is provided. The method comprises identifying distinct, measurable activities. The method also comprises identifying a measure $Y_1 \ldots Y_N$ as at least one of a time duration $(t_1 \ldots t_N)$ corresponding to each activity, and a distance $(d_1 \ldots d_N)$ corresponding to each activity. The method also comprises assigning a weight $(X_1 \ldots X_N)$ to each activity to produce a weighted activity as $A_n = X_n Y_n$; and calculating total event cost ($EC_{total}$) as $$EC_{total} = \sum_{n=1}^{N} (A_n).$$

DETAILED DESCRIPTION

According to various aspects of the present disclosure, approaches are provided for normalizing performance data for the operation of industrial vehicles. The normalization approaches herein may be used to translate performance data across operating facilities (e.g., warehouses), enterprise operations, industries, etc., by providing a normalized measure that is vehicle independent. As such, the normalized measure herein is useful in evaluating industrial vehicles based upon different manufacturers, makes, models, etc.

In this manner, aspects of the present disclosure herein provide a standardized measure of work for an industrial vehicle. By normalizing industrial vehicle work to a standardized and consistent unit of measure, comparative analysis (cost, efficiency or both) may be performed for aspects such as fleet operation, operational efficiency, team efficiency, and industrial vehicle operation.

System Architecture

Aspects of the present disclosure comprise systems that enable industrial vehicles to wirelessly communicate with an application deployed in an enterprise computing environment. As used herein, an industrial vehicle is any equipment that is capable of moving or otherwise being moved about a work site. Exemplary industrial vehicles include materials handling vehicles, such as forklift trucks, reach trucks, turret trucks, walkie stacker trucks, tow tractors, hand operated pallet trucks, etc.

Figure 1:
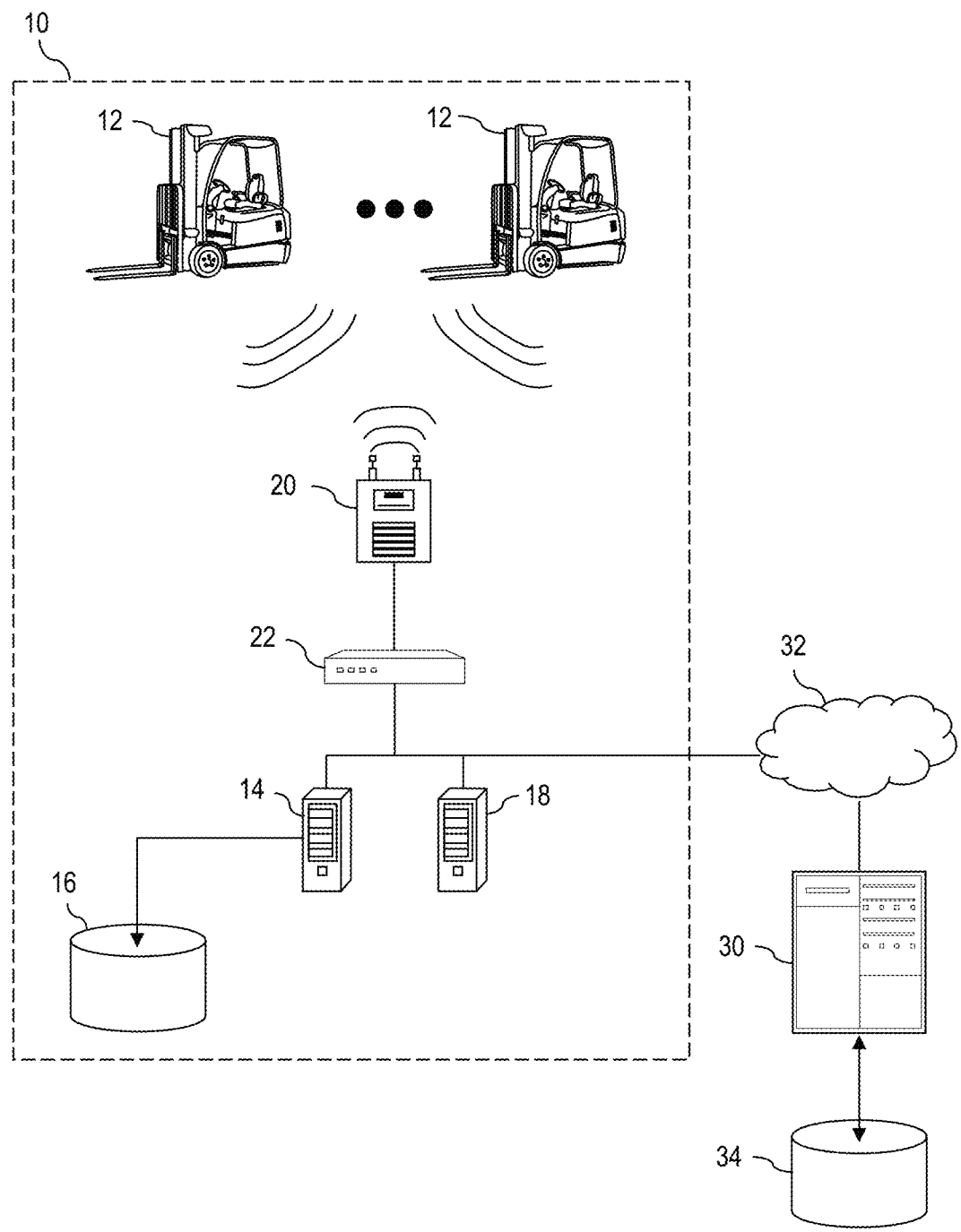
FIG. 1 is a schematic of an illustrative operating environment in which aspects of the disclosure herein may be practiced.

Referring now to the drawings and particularly to FIG. 1, an exemplary computing environment 10 is illustrated, which includes components that support wireless communication capabilities. A plurality of industrial vehicles 12, such as materials handling vehicles (shown as forklift trucks for convenience of illustration), each includes a communications device that enables that industrial vehicle 12 to wirelessly communicate with a processing device, such as an industrial vehicle application server 14. The industrial vehicle application server 14 may further interact with a data resource 16, e.g., one or more databases, data stores or other sources of information, to facilitate interaction with the industrial vehicles 12 as will be described in greater detail herein.

The computing environment 10 may further support additional processing devices 18, which may comprise for example, servers, personal computers, etc. One or more of the processing devices 18 may also communicate with the industrial vehicles 12 and/or the industrial vehicle application server 14 across the computing environment 10.

The wireless communication architecture may be based upon a standard wireless fidelity (WiFi) infrastructure, such as may be deployed using standard 802.11.xx wireless networks for a communications protocol. However, any other suitable protocol may alternatively be implemented. In an exemplary WiFi implementation, one or more wireless access points 20 may be utilized to relay data between a wireless transceiver of each industrial vehicle 12 and one or more wired devices of the computing environment 10, e.g., the industrial vehicle application server 14.

Moreover, the computing environment 10 may be supported by one or more hubs 22 and/or other networking components that interconnect the various hardware and/or software processing devices, including for example, routers, firewalls, network interfaces and corresponding interconnections. The particular networking components provided in the computing environment 10 may thus be selected to support one or more intranets, extranets, local area networks (LAN), wide area networks (WAN), wireless networks (WiFi), the Internet, including the world wide web, and/or other arrangements for enabling communication across the computing environment 10, either real time or otherwise, e.g., via time shifting, batch processing, etc.

Also, one or more computing devices may further communicate with a remote server 30 across a network 32, such as the Internet. The remote server 30 may comprise, for example, a third party server (e.g., operated by the industrial vehicle manufacturer) that interacts with the industrial vehicles 12, the industrial vehicle application server 14 and/or other processing devices 18 of the computing environment(s) 10. The remote server 30 may further interact with a data resource 34, e.g., one or more databases, data stores or other sources of information.

Industrial Vehicle Data Collection

Figure 2:
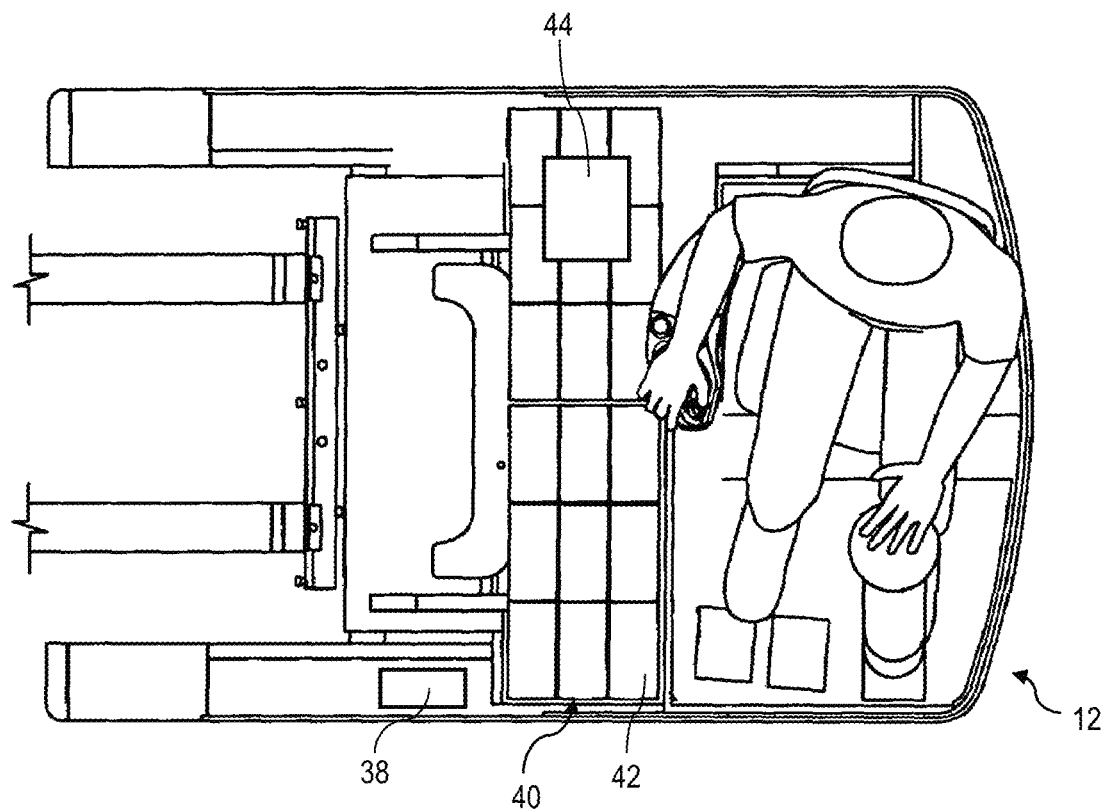
FIG. 2 is a view of an operator in an industrial vehicle having a battery, a battery management system and an information linking device for wirelessly communicating with a computing environment, according to aspects of the present disclosure.

Referring to FIG. 2, an industrial vehicle 12 includes a communication device referred to herein as an information linking device 38, a battery 40 comprised of a plurality of battery cells 42 and a battery monitor 44 that allows monitoring of battery characteristics, e.g., one or more of current, voltage, resistance, temperature, water level, etc.

The information linking device 38, the industrial vehicle 12, and the corresponding computer environment, e.g., as described with reference to FIG. 1, can incorporate any of the features and structures as set out in U.S. Pat. No. 8,060,400 to Wellman, entitled "Fleet Management System", the disclosure of which is herein incorporated by reference in its entirety.

For instance, the information linking device 38 can include a display, a transceiver for wireless communication, e.g., with the application server 14, I/O, a processor in data communication with memory for storing collected data about the corresponding industrial vehicle and/or for implementing methods and processes as set out herein, etc.

In exemplary implementations, the information linking device 38 is coupled to and/or communicates with industrial vehicle system components via a suitable industrial vehicle network system, e.g., a vehicle network bus. The industrial vehicle network system is any wired or wireless network, bus or other communications capability that allows electronic components of the industrial vehicle 12 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy. As will be described more fully herein, utilization of the industrial vehicle network system enables seamless integration of the components of the industrial vehicle information linking device into the native electronics including controllers of the industrial vehicle 12 and optionally, any electronics peripherals associated with the industrial vehicle 12 that integrate with and can communicate over the network system.

The battery monitor 44 communicates with the information linking device 38, the information server 14 or both. Moreover, the battery monitor 44 may be wired to the information linking device 38, or the battery monitor 44 may communicate with the information linking device 38 using a wireless technology such as Bluetooth, etc. The battery monitor 44 may include a processor in data communication with memory, to implement battery monitoring, battery data logging, for implementing methods and processes as set out herein, etc.

Moreover, the battery monitor 44 may interface with various sensors, such as a current sensor, one or more temperature sensors, a water level sensor, voltage sensor, etc. to sample battery characteristics of interest. The results can be stored on the battery monitor itself. In alternative configurations, the samples can be communicated to the information linking device 38 for processing, storage, forwarding to the information server 14, etc. In still further alternative implementations, the results can be forwarded to the information server 14, etc.

Normalization—The Unit of Work

Figure 3:
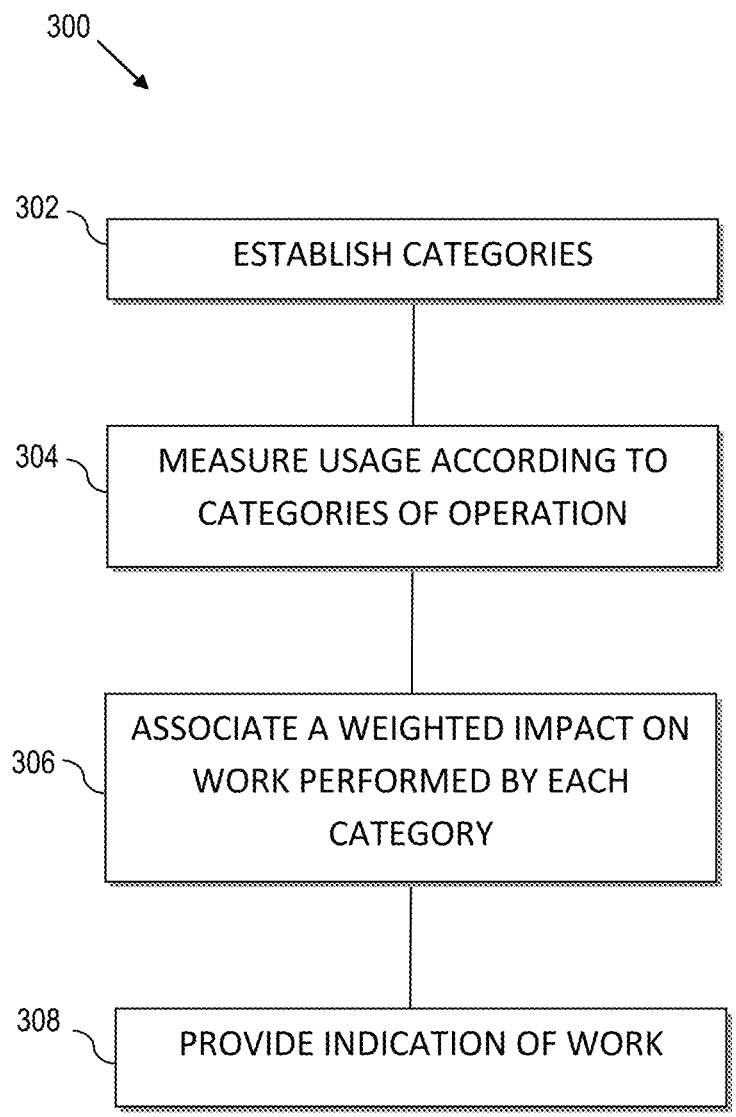
FIG. 3 is a flow chart of a method for normalizing performance data for the operation of industrial vehicles, according to various aspects of the present disclosure.

Normalization approaches herein can be understood with reference to FIG. 3, which illustrates a method 300 of normalizing industrial vehicle performance data.

The method 300 comprises establishing, at 302, at least one category. Each category is associated with a distinct, measureable activity capable of being performed by an industrial vehicle. Moreover, each category is characterized by at least one parameter, which is utilized to measure the corresponding activity. In this regard, the method can establish distinct, measurable, categories of industrial vehicle operation. Examples of categories may include travel distance, travel time, vertical lift distance (i.e., fork raise and fork lower operations), vertical lift time, etc.

The method 300 also comprises measuring, at 304, the actual usage of the industrial vehicle, according to each category of operation. For instance, the method 300 may electronically collect data from an industrial vehicle corresponding to actual vehicle use, where the collected data satisfies the parameter(s) defining each category. This can be accomplished, for instance, using the information linking device 38 connected to the industrial vehicle 12, described with reference to FIGS. 1 and 2. As noted in greater detail herein, the information linking device 38 can communicate with components, e.g., vehicle controllers, vehicle processors, sensors, monitors, encoders, etc., by communicating across a vehicle network bus. The information linking device 38 can also use dedicated input/output connections to interface with various sensors, encoders, switches, and other devices on the industrial vehicle. Thus, in the above example, the method maps data types that can be extracted from the industrial vehicle 12 by the information linking device 38, to the parameter(s) that define the category (or categories). During use of the industrial vehicle, the information linking device 38 extracts the data values corresponding to the data types that are mapped to parameters of the categories to generate the underlying data necessary to compute a unit of work, as described in greater detail herein.

The method at 304 may also accumulate the collected data according to each category. Thus, as the industrial vehicle 12 is operated, the data associated with each category is accumulated to provide the ability to normalize the industrial vehicle usage across a range of operations. For instance, if a category is travel distance, the parameter may be an expression of distance. As such, as the industrial vehicle is operated (e.g., throughout a shift), the total distance traveled is accumulated.

The method may wirelessly transmit the measured usage to a remote server at 304, such as by using the information linking device 38 to communicate the collected data to the information server 14. In this regard, the accumulation may be carried out at the industrial vehicle or at the server. For instance, the industrial vehicle may be configured to send data to the server in batches, e.g., based upon a preset time interval or otherwise. In this situation, the server may accumulate the data. As another example, the industrial vehicle may be outside the range of the wireless infrastructure (e.g., within a semi trailer on a loading dock). As such, the information linking device on the industrial vehicle may accumulate usage data.

The method 300 also comprises associating, at 306, for each category, a weighted impact on the work performed by each category as a function of energy consumed in performing that work at 306.

The method 300 also comprises providing, at 308, an indication of the work performed by the industrial vehicle. The particular manner in which the indication is provided, will likely depend upon the implementation. However, some examples are described in greater detail herein.

Figure 4:
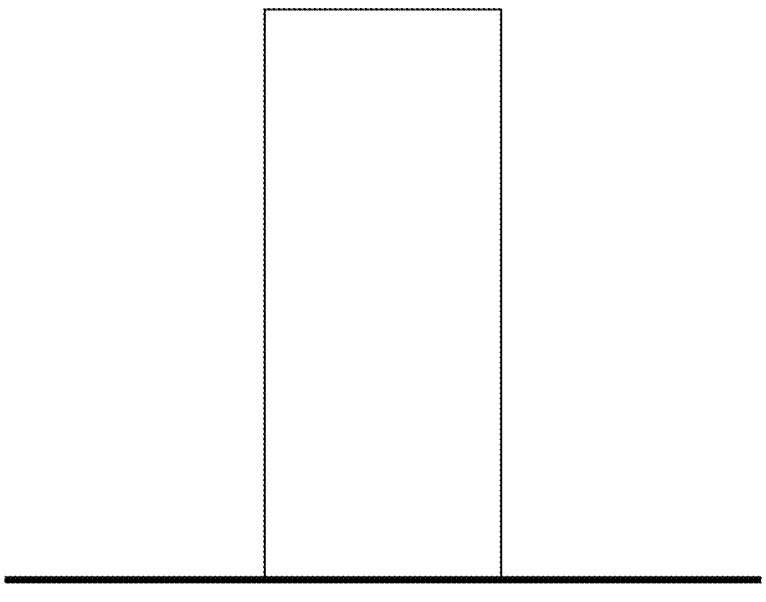
FIG. 4 is an exemplary representation of a single category for industrial vehicle monitoring, according to aspects of the present disclosure.

Working Examples:

Referring FIGS. 2, 3 and 4 generally, a simplified approach to categorizing operations of an industrial vehicle into distinct, measureable activities (see 302 of FIG. 3) is to define a single category, corresponding to "in use". For instance, the illustrated "in use" category 400 is a measure of when the industrial vehicle is operated. This may comprise travel operations, lift operations, other operations and combinations thereof. That is, any operation of use may be grouped into the single category.

In an illustrative implementation, the measure of actual vehicle usage may be recorded by a communications device (e.g., information linking device 38) monitoring various industrial vehicle controllers, e.g., traction control, hydraulics control, etc. through the vehicle network bus to determine the total industrial vehicle use. The information linking device 38 may, for instance, communicate across a vehicle CAN bus to determine the total distance traveled, total time spent traveling, total distance that forks of the industrial vehicle are moved during lift operations, etc.

As used herein, lift operations correspond to the lift distance, e.g., to the distance that the forks move on the industrial vehicle. This may be raise only operations, lower only operations, or a combination of raising and lowering operations, as the particular application may dictate.

The singular in use measure may be expressed in an interval such as time (e.g., minutes of use), in distance (e.g., feet traveled) or a combination of the two. That is, the "in use" implementation can be used to capture a measure of work that is done by an industrial vehicle.

As noted above with reference to FIG. 2, the industrial vehicle may also include a battery monitor 44. The battery monitor 44 can be used to measure power drawn, current drawn or other measures necessary to determine the energy consumed in order to perform the work measured by the information linking device 38.

By correlating the information collected by the information linking device 38 with the battery usage history collected by the battery monitor 44, a measure of the performance of the industrial vehicle 12 may be derived based upon work performed and energy required to perform the measured work.

The basic concept of FIG. 4 can be expanded to comprehend multiple categories. For instance, with reference to FIGS. 2, 3 and 5, an example is provided where at least four categories of industrial vehicle work are defined. The categories conceptually define "buckets" of productivity that split the activity of the industrial vehicle, e.g., by time. For instance, categorizing operations (see 302 of the method 300) may comprise distinguishing lift operations from travel operations. In an illustrative example, operations may be more narrowly defined as "Travel Loaded"—travel operations while the industrial vehicle is traveling with a load; "Travel Unloaded"—travel operation while the industrial vehicle is traveling without a load; "Lift Loaded"—lift operations involving a load; and "Lift Unloaded"—lift operations not involving a load.

In an illustrative example, an encoder or other suitable device is utilized to measure lift travel. The distance traveled by the industrial vehicle can be measured using odometer measurements (taking into account tire travel and slippage), location tracking systems, navigation systems, combinations of the above, etc.

Keeping with the above example, the communications device (information linking device 38) on the industrial vehicle may be used to measure the actual usage of the industrial vehicle as a function of each category. For instance, in an illustrative implementation, the measure of actual vehicle usage may be recorded by the information linking device 38 monitoring various industrial vehicle controllers, e.g., traction control, hydraulics control, etc., through the vehicle network bus to determine the total industrial vehicle use. The information linking device 38 may, for instance, communicate across a vehicle CAN bus to relevant native vehicle controllers to determine the total distance traveled, total time spent traveling, total distance that forks of the industrial vehicle are moved during lift operations, etc., for each category.

By way of example, the information linking device 38 may measure a travel distance, where the travel distance is the distance traveled by the industrial vehicle while the industrial vehicle is being operated. The information linking device 38 may also separately measure a lift distance, where the lift distance is the distance of lift operations performed by the industrial vehicle while being operated. Still further, the information linking device 38 may separately measure a travel time, where the travel time is the time required to travel the travel distance. Still further, the information linking device may separately measure a lift time, where the lift time is the time required by the lift operations. Still further, the above-categories can be further defined into smaller subcategories, such as travel with load, travel without load, lift with load and lift without load.

In certain implementations, lift, while generally describing vertical movement, can be further sub-divided into raising operations (movement against the direction of gravity) and lowering operations (movement in the direction of gravity). As such, raising operations may affect usage differently from lowering operations. Also, it should be appreciated that vehicle idle time may also contribute a different usage amount when considered along with the other recited movements. In other words, even when the vehicle is not traveling or lifting (raising or lowering), there still exists a nominal drain on the battery that results from the vehicle simply being in an operational state, but not moving. Further clarification is provided below with reference to a specific example.

Figure 5:
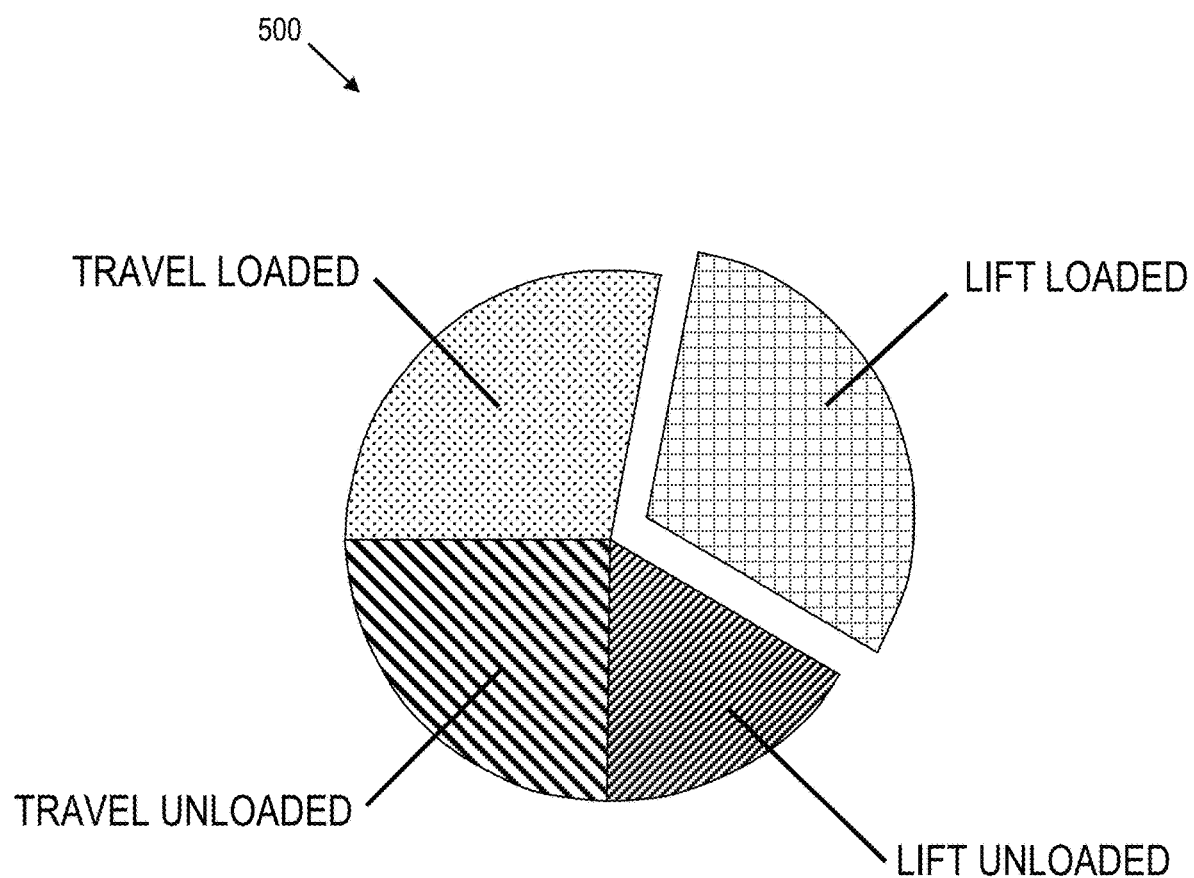
FIG. 5 is an exemplary representation of a set of categories for industrial vehicle monitoring, according to aspects of the present disclosure.

Some industrial vehicles enable "blending", which is the simultaneous performance of two or more features that define work. An example of blending is the simultaneous performance of a lifting operation with a travel operation, etc. Blending may define one or more additional categories, e.g., a category for each class of blending. Thus, the capabilities of the particular industrial vehicle, and the desired complexity/resolution of the method 300 will be used to determine the number of categories. In this regard, the listing of categories of FIG. 4 and FIG. 5 are by way of simplified illustration of concepts, which are not presented by way of limitation.

Moreover, as noted above, the battery monitor 44 may be utilized for extracting information from a battery coupled to the industrial vehicle so as to measure actual energy consumed by the industrial vehicle over the travel and/or over the lift operations (for each category). As such, the battery monitor facilitates associating for each category, a weighted impact on work performed by that category as a function of energy consumed in performing that work. In this regard, the battery monitor 44 may be replaced by one or more sensors, e.g., a current sensor, voltage sensor, temperature sensor, or combination thereof, in data communication with the information linking device 38 or a suitable data capture device.

Actual or Estimated

As noted in greater detail herein, the industrial vehicle 12 includes a battery monitor 44 that is capable of sampling battery characteristics, e.g., current drawn from the battery during use. As such, the industrial vehicle's use of energy as a function of work can be based upon actual measurements. Alternatively, the industrial vehicle's use of energy as a function of work can be based upon an assigned parameter. The assigned parameter may be implemented as a programming variable assigned by a remote server, a value stored within the information linking device 38 or information server 14, etc. Such an arrangement may be useful, for instance, where an industrial vehicle does not have a battery monitor 44. Moreover, estimated and/or actual energy use may be static or dynamic. Also, the estimated and/or actual energy use may be task dependent. Regardless, in illustrative implementations herein, work performed by the industrial vehicle is measured in power expended per unit of time. An example comprises kilowatt hours (kWh). The use of kilowatt hours allows for the normalization of energy usage as a function of work.

Cost of Work

Aspects of the present disclosure herein contemplate that work performed by an industrial vehicle corresponds in general, to the amount of energy transferred by the industrial vehicle acting through a distance, e.g., net force times a change in distance. In this regard, one approach to defining a weighted impact on work performed by a category as a function of energy consumed in performing that work, is to express the weighted impact as a "cost".

According to aspects of the present disclosure, a work measure (i.e., weighted impact) is defined, that is expressed as power expended per unit of time, e.g., kilowatt hours. To determine kilowatt hours of use, the wattage (in watts) times the hours used divided by 1000 provides kilowatt hours. In practice, the battery voltage is known or measureable, and is multiplied by the various measured current draws over time by the battery monitor 44 to compute power in watts. In other examples, power can be calculated in other ways, e.g., using load resistance and current, load resistance and voltage, etc.

To further reduce the calculation to a measure of financial cost (cost in dollars), the computed usage in kilowatt hours is multiplied by cost per kilowatt hour. The cost value may vary, e.g., based upon the cost to acquire the energy (to charge the battery for instance). The cost per kilowatt hour may fluctuate based upon geographic location, day, season and any number of other factors. However, all such factors are identifiable or discoverable to the system.

Moreover, the cost can be further characterized. For instance, because both time and distance measurements are available, the system can consider the cost as a function of distance. By way of example, the system can further characterize work per unit distance, e.g., kWh/ft.

Static Assignment

Various aspects of the present disclosure assign a static baseline value to each defined category of operation. That is, each category can be given a relative weighted impact on work, e.g., weighted impact on the work to energy ratio (and in turn, cost) due to the amount of energy used. Keeping with the above example, of both travel and lift operations, each with load and without load, a static assignment can be made to associate a cost per category. In a non-limiting but illustrative example, Travel Unloaded may be assigned a first cost, e.g., 10 kWh/ft. Travel Loaded may be assigned a second cost, e.g., 15 kWh/ft. Lift Unloaded can be assigned a third cost, e.g., 20 kWh/ft. Moreover, Lift Loaded can be assigned a fourth cost, e.g., 25 kWh/ft. Of course, the above is merely illustrative, and any assigned static amount can be assigned.

Dynamic Assignment

The values for the weighted impact on work used when the industrial vehicle is loaded may be dependent upon the weight of the load being carried. Any number of techniques may be employed to account for load weight. For instance, static approximations can be used. Alternatively, a baseline static value can be used, as supplemented by a dynamic contribution that accounts for the weight of the load. As further alternatives, the categories can be defined granularly to include many buckets, each bucket holding a load or range of loads. Still further a correction, graduated scale, etc. may be used. For dynamic loading, there is an increased demand in the quantity of data required to accurately track the dynamic load as compared to the static implementation. However, the information linking device 38 and/or battery monitor 44 may have sufficient bandwidth to capture the quantity of required data to implement dynamic compensation.

Task Profiles/Usage Profiles

According to aspects of the present disclosure, the categories can be utilized to evaluate energy in terms of predetermined tasks, e.g., based upon task profiles (also referred to herein as usage profiles). For instance, in a warehouse operation, work may be measured by a factor such as "pallets moved". However, tasks may also comprise measures over a shift, day, week, replenishment operation, pick operation, etc.

Moreover, the system can track actual compared to ideal numbers and measure how efficiently an executed task associated with a task profile is performed. In this regard, an average kWh/ft value can be established (ideal, measured or both) per industrial vehicle, based upon task profiles.

For instance, a task profile may specify that for a given industrial vehicle (or type of industrial vehicle/fleet of industrial vehicles, plant location, or other logical grouping) a put away profile has a first weighted impact on work (i.e., cost), e.g., 23.2 kWh/ft. A second task profile, e.g., a replenish profile has a second cost, e.g., 22.7 kWh/ft. Another task profile has a third cost, e.g., 13.8 kWh/ft, and yet another task profile, e.g., a transport profile, has a fourth cost, e.g., 11.6 kWh/ft. Of course, any number of task profiles with different costs may be provided by an implementation of the systems and methods set out herein.

Figure 6:
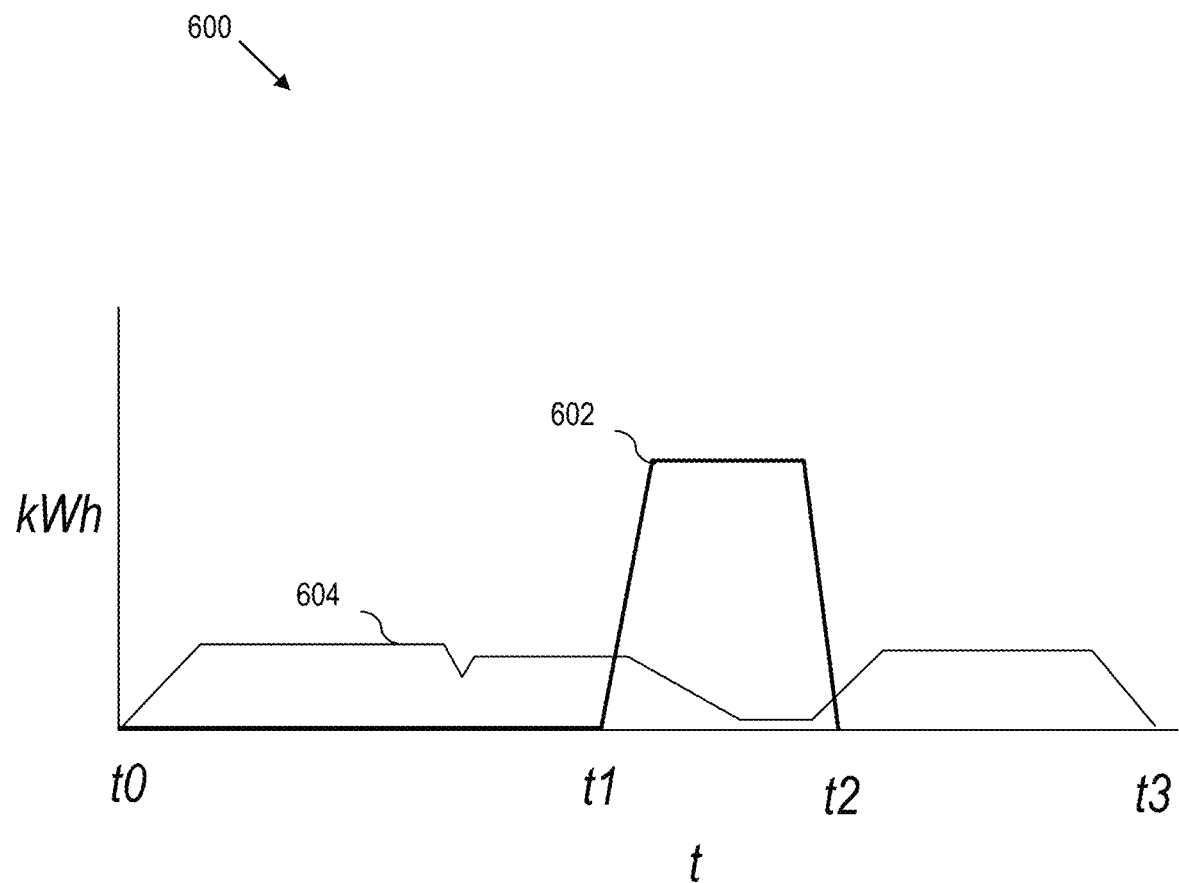
FIG. 6 is a chart showing exemplary travel and lift operations plotted as kilowatt hours as a function of time, according to aspects of the present disclosure.

Referring to FIG. 6, a chart 600 illustrates via exemplary data, kWh as a function of total lift distance 602. The chart 600 also illustrates kWh as a function of time for total distance traveled 604. By evaluating kWh over time, trends and useful data can be extracted.

For instance, the chart illustrates that at t0, the industrial vehicle was stationary. The industrial vehicle began traveling as noted by 604 having a non-zero value between t0 and t1. At t1, the kWh as a function of total lift distance 602 spikes, levels off then subsides by t2. This informs an analyst that a put away was likely being performed. Also, total distance traveled 604 is non-zero at the initial time that the total lift distance 602 begins to spike. Because the total distance traveled 604 is non-zero, it can be presumed that a blending operation was being performed. From t2 to t3, the travel distance is non-zero, indicating travel of the industrial vehicle. However, the lift distance is zero, indicating that the industrial vehicle has not engaged in a lift operation.

Figure 7:
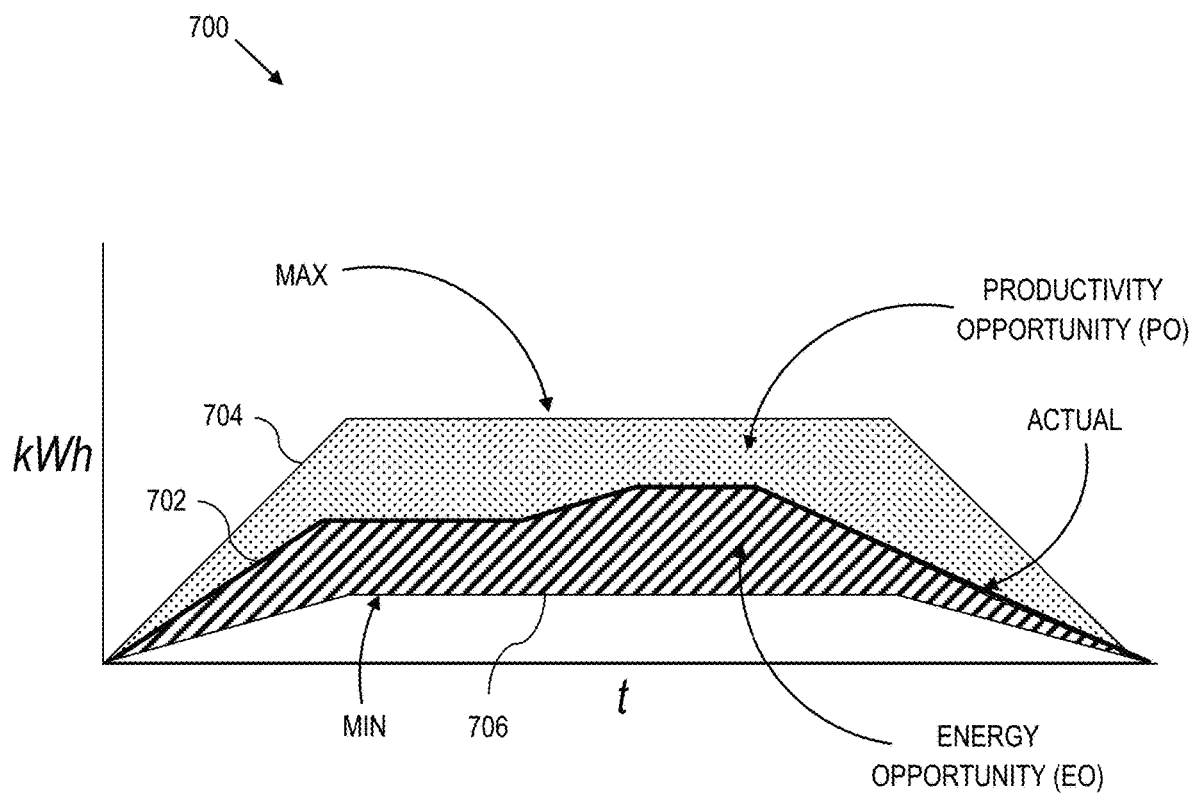
FIG. 7 is a chart plotting exemplary kilowatt hours as a function of time for an ideal compared to a measured response, according to aspects of the present disclosure.

Referring to FIG. 7, a chart 700 illustrates an example measurement 702 of actual work in kWh performed by an industrial vehicle as a function of time. The chart 700 also illustrates a first ideal curve 704 (Max curve) representing operation of the industrial vehicle in an ideal manner where energy usage is maximized in favor of potentially (but not necessarily) increasing worker productivity. For instance, operating the industrial vehicle along the first ideal curve 704 may correspond to operation of the industrial vehicle at its maximum capability, thus maximizing the potential of the industrial vehicle to get work done, e.g., move pallets.

The chart 700 also includes a second ideal curve 706 (Min curve) representing operation of the industrial vehicle in an ideal manner where energy usage is minimized, potentially (but not necessarily) at the reduction of worker productivity. For instance, operating the industrial vehicle along the second ideal curve 706 may correspond to operation of the industrial vehicle in a manner that minimizes use of energy.

The area between the example measurement 702 and the first ideal curve 704, and the area between the example measurement 702 and the second ideal curve 706, represent opportunity for improvement. More particularly, the area between the first ideal curve 704 and the example measurement 702 represents an opportunity for an operator to improve worker productivity by better taking advantage of the capabilities of the industrial vehicle, e.g., to move more pallets in a given timeframe. The area between the second ideal curve 706 and the example measurement 702 represents an opportunity for an operator to improve energy conservation. This may be accomplished, e.g., through more efficient use of blending, traveling with a load lower on the forks, etc.

Thus, the availability of improvement opportunity is the integral of the Max (ideal) usage over time (t) minus the integral of the actual usage as a function of time (t) in order to improve productivity opportunity (PO). Likewise, the availability of improvement opportunity is the integral of the Actual usage over time (t) minus the integral of the Min usage as a function of time (t) in order to improve energy opportunity (EO). In this regard, the selection of the proper sampling rate is necessary to achieve the desired resolution of performance and measure.

The above chart 700 also demonstrates that opportunities exist to optimize industrial vehicle utilization based upon a customized profile. For instance, it may be that a particular implementation does not want to fully maximize energy consumption (Max curve) or energy conservation (Min curve). As such, a customized energy profile can be created that follows a path intermediate to the first ideal curve 704 and the second ideal curve 706. Moreover, multiple energy profiles may be created, each for a desired purpose. Still further, a system such as that described more fully herein can capture the actual operator energy use, and create a usage profile that can be compared to a customized profile. As yet another example implementation, multiple energy profiles may be available to the operator. The industrial vehicle operator can then select an energy profile that is suitable for the operator and/or operator assigned tasks. For instance, the operator can be first shown their actual energy usage. Based upon knowing their actual energy usage, the operator may have the opportunity to select among one or more energy profiles. This information can be utilized for assessments of energy use compared to worker productivity, examples of which are set out in greater detail herein.

Efficiency Assessments

According to aspects of the present disclosure, the assessment of operations and operation efficiency can be carried out in an efficient and organized manner. For instance, the unit of work discussed more fully herein, may be used to implement a warehouse management system that is standardized to the industrial vehicle. That is, by measuring the work performed by each industrial vehicle, data is naturally collected as a matter of normal operation. According to aspects of the present disclosure, pre-determined tasks can be utilized against which standardized measures of each industrial vehicle work is measured (e.g., on an individual vehicle basis). This allows the measurement of work required by various industrial vehicles to perform activities, such as put-aways, picks, etc. Thus, the normal job of an industrial engineer with a stop watch and a clip board is replaced with an accurate, automatic, continuous data collection device. The analyst simply allows the industrial vehicles to do their jobs and allow the data to be collected. Once collected, the analyst can evaluate the collected data to perform any necessary operations optimizations that are desired.

Operational Productivity

According to aspects of the present disclosure herein, operational productivity can be evaluated. More particularly, the unit of work described herein allows for a vehicle-driven standard for measuring performance. Thus, a standard of measure can be customized to each particular industrial vehicle. By customizing the standard to the truck, any factors unique to the industrial vehicle can be normalized out of an analysis, so that activities such as performance measures related to the operation of the industrial vehicle can be more accurately evaluated. For example, an operator using an older truck is not penalized in a performance assessment due solely to the truck. Rather, the normalized capabilities of the truck serve as a benchmark for gauging the performance of operations involving the industrial vehicle.

As a few additional illustrative examples, in evaluating operation productivity, the cost of inputs to a productivity calculation, divided by the revenue of output should be less than a maximum acceptable productivity ratio. Using the techniques herein, various productivity metrics can be realized. For instance, a ratio can be measured, representing the total time spent on the industrial vehicle while using the vehicle for productive work. As another example, time required to perform certain tasks can be evaluated. This may be an inverse relationship to pallets moved for a given time period. Moreover, the efficiency of the industrial vehicle itself can be evaluated (e.g., kWh as a function of work completed/tasks completed.

Still further, aspects of the present disclosure herein allow an analysis of the cost of operation in terms of compensation, the cost of energy to perform work (e.g., in dollars per kWh), etc.

Universal Units of Work—Work Unit (W.U.)

According to aspects of the present disclosure, a method of normalizing performance data for the operation of industrial vehicles, comprises defining a universal unit of work. A universal unit of work may be determined by measuring the total horizontal movement of an industrial vehicle over a pre-determined interval and measuring the total vertical movement of the forks of the industrial vehicle over the pre-determined interval. The universal unit of work is further defined by summing the total horizontal movement and the total vertical movement to a summed total and dividing the summed total by a standardizing factor.

The universal unit of work may be used with the other approaches herein. For instance, a method may define a plurality of categories, each category corresponding to a predefined task, as described in the examples discussed with FIGS. 3 and 4. Moreover, the universal unit of work may be used with predefined tasks, e.g., using the task profiles described more fully herein. This allows standardized measures of varying degrees of granularity. For instance, industrial vehicles can be compared down to the measure of a work unit. Alternatively, comparisons can be made by category, e.g., travel with a load, travel without a load, lift with a load, lift without a load, blending, etc. Still further, comparisons can be made for particular tasks (usage profiles) such as picks, replenishments, pallet movement, etc. Still further, comparisons can be made on operators, teams, shifts, fleets, industrial vehicles, and other desired measures.

Figure 8:
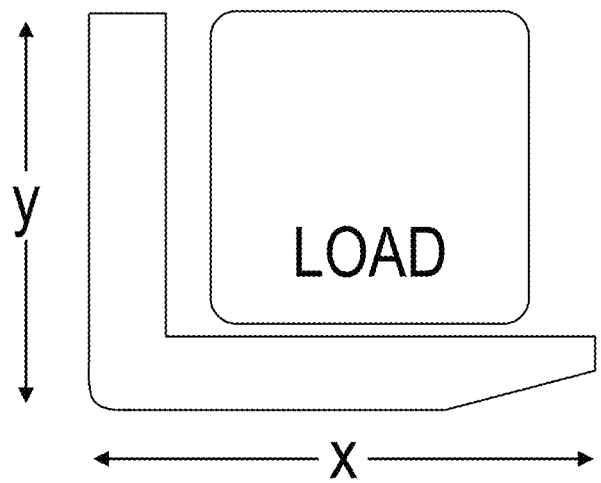
FIG. 8 is a schematic representation of the movement of a load in the horizontal and vertical directions, according to aspects of the present disclosure.

Referring to FIG. 8, the Work unit is a mechanism for normalizing performance data across warehouses, operations and industry-vertical database categories.

Let X=Total Horizontal Travel Distance Loaded (e.g., in feet)

Let Y=Total Vertical Lift Distance Loaded (e.g., in feet)

Let $\Sigma(X,Y)/Z$=Total Work units (W.U.). Here, Z is the standardizing factor. That is, Z is an arbitrary number selected to normalize the summation to a reasonable number for convenience of manipulation of the unit of work. In an illustrative implementation, Z=100. Thus, as a few illustrative examples:

1 W.U.=100 feet moved with a load in either/both directions;

1 W.U.=80 feet traveled loaded+20 feet lifted loaded;

1 W.U.=100 feet traveled loaded+0 feet lifted loaded.

The W.U. may be utilized to evaluate the cost of operation by dividing cost by the W.U. that was determined to derive cost/W.U. The W.U. can be used with the categories described above with reference to FIGS. 3-7. For instance, the W.U. can be computed for each category, and the calculated W.U. for each category can be applied to determine cost of operations.

Management

According to various aspects of the present disclosure, the unit of work herein, can be utilized to create management standards based upon a combination of dynamic tasks (i.e., tasks centered around the industrial vehicle), static tasks (i.e., non-dynamic tasks not utilizing the industrial vehicle), or combination of dynamic and static tasks. Thus, using the unit of work described herein, warehouse management systems, labor management systems, etc., can shift to a vehicle-centered focus. Moreover, tasks can be characterized in the management system, which are normalized by the industrial vehicle. For instance, vehicles for tasks such as pick and put away operations may be allocated based upon the cost per vehicle to complete each operation in order to drive cost of fleet ownership down. Still further, factors that may ultimately affect the performance of an industrial vehicle, e.g., battery condition, tire diameter, tire wear, hydraulic pump motor efficiency, operation of the industrial vehicle, etc. can be fleshed out using the industrial vehicle comparisons.

Analyst Dashboard

As noted above with regard to FIG. 1 and FIG. 2, the information linking device 38, the battery monitor 44 or both, can communication collected information to a remote server, e.g., server 14. This allows the server to explore the collected data to generate reports, displays, etc. In an illustrative implementation, a (near) real-time dashboard displays information about the work being performed by a fleet of industrial vehicles.

For instance, a dashboard may reside on an analyst or manager computer screen desktop to allow the analyst to monetize the opportunities for improvement in the operation of the managed industrial vehicle fleet, to prioritize activities and take action.

In general, an analyst can use the above-described data to answer queries such as "which opportunities represent the largest savings and highest priority"; "what actions are required to take to realize savings", etc. The analyst can start off by measuring relative performance. For instance, a database (e.g., local site's application specific database or a broad vertical database of a manufacturer, such as database 34 of FIG. 1) of warehouse performance is utilized to identify opportunities for reducing operational waste (cost) by comparing a site (environment) performance to performance in their industry. Monetization of the delta between actual performance and the benchmarked performance from the historical databases (customer's data or industry data) can be implemented. Monetization of opportunities helps managers prioritize their focus.

An exemplary dashboard may show, for example, a main cost rollup charting cost per unit work of a fleet of industrial vehicles over a period of time. Thresholds can be set where the cost/unit work is too high, thus triggering an alert. Approaches such as that above, provide an opportunity in identifying money that has been spent in the operation (for example, cost per hour of operators that have been driving industrial vehicles). A second opportunity is lost time, measured in terms of money (for example, excessive non-productive time spent on the industrial vehicles).

Specific Example

Having described various embodiments, this disclosure provides a specific example in an effort to more clearly describe how the above-described embodiments may be implemented. It should, however, be appreciated that this specific example is a non-limiting example and is only provided for purposes of clarity.

By way of example, presume that a 3 ton (2,721 Kilogram) unloaded forklift truck that is located in a center of a 5,000-foot-by-5,000-foot (1524 meter×1524 meter) warehouse will be used to carry a 2000 pound (907 Kilogram) pallet from a three-foot-high shelf (0.91 meter shelf) on a first location of the warehouse to an eight-foot-high shelf (2.44 meter shelf) at a second location of the warehouse. For simplicity, presume that only orthogonal paths are permitted (e.g., 90-degree left turns, 90-degree right turns, 180-degree U-turns, straight-line paths, etc.). With these presumptions, the example calculation would proceed as follows.

The unloaded forklift proceeds northbound from the center of the warehouse, and travels 25 feet (7.62 meters). This unloaded, northbound travel draws 50 amperes of current from a 36 volt, 600 amp-hour battery over the course of 0.2 minutes. When the unloaded forklift reaches the northern stopping point, it makes a 90-degree turn toward the east. This 90-degree turn draws 25 amperes of current from the battery over 0.1 minutes. The unloaded forklift then travels eastbound 25 feet (7.62 meters) until it reaches the destination where the pallet resides. This eastbound travel draws 50 amperes of current from the battery over 0.2 minutes.

To the extent that the pallet is located on a three-foot-high shelf (0.91 meter shelf), the forklift raises its forks three feet (0.91 meter) and moves forward to place the forks underneath the pallet and slightly raise the now-loaded forks. This lifting operation draws 100 amperes of current over 0.2 minutes. The now-loaded forklift makes a 180-degree U-turn, drawing 50 amperes of current from the battery over 0.1 minutes. The forks are lowered three feet (0.91 meter) to ground level, drawing 10 amperes of current over 0.1 minutes. The lowering operation draws less current than the raising operation, since the work is being done along the direction of gravity rather than against the direction of gravity.

For this example, other traffic in the warehouse causes the now-loaded forklift to remain stationary (or idles) for 2 minutes, for which 10 amperes of current are drawn due to the idle time. Because the forklift is still in operation, idling draws some nominal amount of current from the battery.

Having made the U-turn, the loaded forklift travels 50 feet (15.24 meters) westbound, thereby drawing 150 amperes from the battery over 0.7 minutes. From this example, the loaded forklift draws more current and moves more slowly than the unloaded forklift. Upon reaching the western stopping point, the loaded forklift makes a 90-degree southward turn, which draws 50 amperes over 0.3 minutes. Thereafter the loaded forklift travels southbound 50 feet (15.24 meters) to its final destination where the pallet is to be unloaded. This southbound travel draws 150 amperes over 0.7 minutes.

Having reached the southwest destination, the loaded forklift raises its forks slightly above eight feet (2.44 meter), which is the height of the shelf on which the pallet must be deposited. That lifting operation draws 200 amperes over 0.2 minutes. This raising operation with the pallet draws more current than the raising operation without the pallet, since more energy is needed to raise loaded forks than unloaded forks.

The pallet is placed on the shelf, and the now-unloaded forklift moves backward 10 feet (3 meters) while concurrently lowering its forks from eight feet (2.44 meter) to ground level (for a total linear distance of 12.8 feet/3.9 meters). In other words, having unloaded the pallet, the unloaded forklift performs a blended operation (concurrently traveling and lowering of forks). This blended operation draws 25 amperes of current over 0.1 minutes.

Thus, in this specific example, the total event cost (or the cost of the entire sequence of events) of this operation is 31,320 kWh. This event cost was expended over the course of 4.9 minutes and over a total distance of 176.8 feet (53.89 meters).

Should more information than simply the total event cost be desired, then the total event cost can be further weighted or modified to extract those numbers. For example, in a very simple example, the total event cost can be divided by the total linear distance traveled by the forklift to provide the event cost per unit distance (i.e., kWh/ft) or event cost per unit time (i.e., kWh/min). So, for this particular example, the event cost per unit distance would be 177.1 kWh/ft and the event cost per unit time would be 6391.8 kWh/min.

As noted above, each distinct operation (e.g., idle, unloaded travel, loaded travel, unloaded raising, loaded raising, unloaded lowering, loaded lowering, turning, etc.) results in a different current draw on the battery. In other words, each distinct operation results in a different usage cost. As such, one may wish to know more than simply the coarse kWh/ft or kWh/min. For those types of specifics, one may assign a distinct weighting factor that corresponds to each distinct task to properly reflect the actual energy cost for those distinct tasks. For example, from experimental measurement data, a higher weight can be assigned to loaded raising of the forks than unloaded lowering of the forks, and yet another weight to vehicle idling, etc. By assigning weighting factors indicative of each distinct task, the system can more-accurately estimate the total energy cost associated with a predefined task. Also, this weighting factor may take into consideration the weight of a particular vehicle (e.g., hand operated pallet truck may be assigned a lower weight than an industrial forklift truck, since one would require more current than the other).

Taking all of these factors into account, it is mathematically possible to assign a universal unit of work (W.U.), as described above, which permits an equivalent comparison between the hand operated pallet truck and the industrial forklift truck. In other words, the universal unit of work would effectively allow comparisons of vehicles and tasks that were previously difficult (if not impossible) without the W.U.

By way of example, using the specific forklift example, the total event cost ($EC_{total}$) may be calculated according to the following equations:

$$EC_{total} = \sum_{n=1}^{N} (A_n), \qquad [\text{Eq. 1}]$$

where $A_n = X_n t_n$, with $A_n$ representing a weighted activity, $X_n$ representing a weight, and $t_n$ representing a time-duration during which each corresponding activity is being performed. From Eq. 1, a normalized event cost ($EC_{norm}$) can be calculated as:

$$EC_{norm} = \frac{EC_{total}}{\sum_{n=1}^{N} (t_n)}, \qquad [\text{Eq. 2}]$$

Should one wish to scale the normalized event cost with a scaling factor (S), then Eq. 2 can simply be multiplied by the scaling factor (S).

In another example, rather than using time as a baseline, the total event cost ($EC_{total}$) may be calculated using distance as a baseline. So, in Eq. 1, $A_n = X_n d_n$, with $A_n$ representing a weighted activity, $X_n$ representing a weight, and $d_n$ representing a distance that corresponds to the activity that is being performed. From this, the normalized event cost ($EC_{norm}$) can be calculated as:

$$EC_{norm} = \frac{EC_{total}}{\sum_{n=1}^{N} (d_n)}, \qquad [\text{Eq. 3}]$$

Again, should one wish to scale the normalized event cost with a scaling factor (S), then Eq. 3 can simply be multiplied by the scaling factor (S).

Since each activity or task expends a different amount of energy (e.g., raising loaded forks expends more energy than lowering unloaded forks, etc.), and since each different type of vehicle expends a different amount of energy for the same task (e.g., forklift expends more energy than hand pallet mover, etc.), the weight is a function of both vehicle type and activity type (e.g., unloaded traveling, loaded traveling, unloaded turning, loaded turning, unloaded raising, loaded raising, unloaded lowering, loaded lowering, blended combination of activities, etc.) and a combination of vehicle type and activity type.

The specific numbers (e.g., amperes of current drawn, minutes traveled, weight of the pallet, truck weight, type of truck, etc.) are only used as examples, and these numbers may be different based on actual measurements, more-detailed specifications, etc. Also, it should be appreciated that experimental results from varying vehicles, tasks, and conditions can be used to refine weighting factors that are used to derive the universal W.U.

Figure 9:
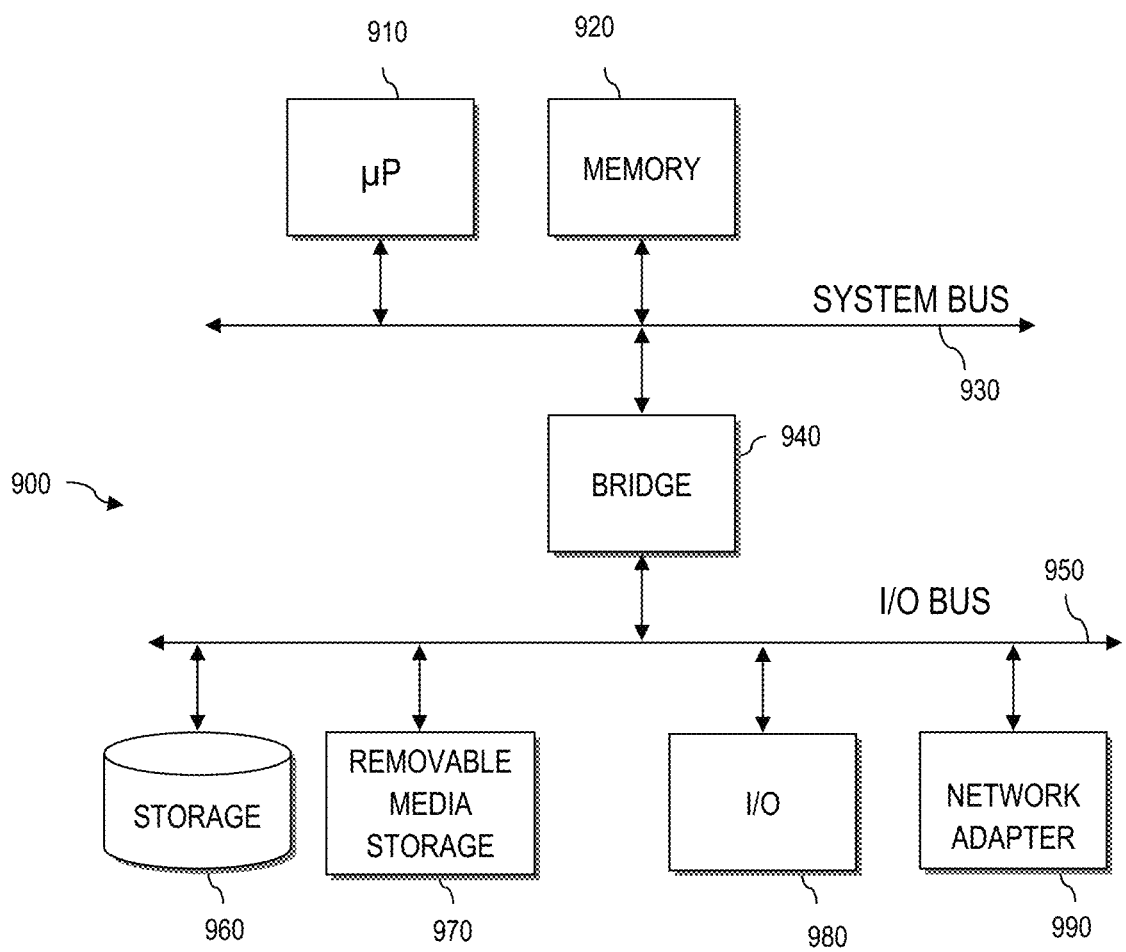
FIG. 9 is a diagram illustrating a computer system for executing computer-readable program code, according to various aspects of the present disclosure.

Referring to FIG. 9, a schematic of an exemplary computer system having computer readable program code for executing aspects described herein with regard to the preceding FIGURES. The computer system can be in the server computer 14, the information linking device 38, the battery monitor 44, combinations thereof, etc.

The computer system 900 includes one or more microprocessors 910 that are connected to memory 920 via a system bus 930. A bridge 940 connects the system bus 930 to an I/O Bus 950 that links peripheral devices to the microprocessor(s) 910. Peripherals may include storage 960, such as a hard drive, removable media storage 970, e.g., floppy, flash, CD and/or DVD drive, I/O device(s) 980 such as a keyboard, mouse, etc. and a network adapter 990. The memory 920, storage 960, removable media insertable into the removable media storage 970 or combinations thereof, implement computer-readable hardware that stores machine-executable program code for implementing the methods, configurations, interfaces and other aspects set out and described herein.

Still further, the exemplary computer system may be implemented as an apparatus for normalizing industrial vehicle performance data, which may comprise a processor (e.g., microprocessor 910) coupled to a memory (e.g., memory 920, storage 960, removable media insertable into the removable media storage 970 or combinations thereof), wherein the processor is programmed to normalize industrial vehicle performance data by executing program code to perform one or more of the methods set out herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, e.g., the system described with reference to FIG. 9. Thus, a computer readable storage medium, as used herein, is not to be construed as being transitory signals per se, such as radio waves or other freely propagating electromagnetic waves through a transmission media.

Computer readable program instructions described herein can be downloaded to respective computing/processing devices from a computer readable storage medium or to an external computer or external storage device via a network, for example, the Internet, a local area network, a wide area network and/or a wireless network.

Aspects of the present disclosure are described herein with reference to flowchart illustrations and/or block diagrams. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A system for measuring industrial vehicle usage, the system comprising:
an information linking device coupled to a vehicle network bus of an industrial vehicle, wherein the information linking device is operatively configured as an electronic component that:
establishes a category that is:

associated with a distinct, measurable activity capable of being performed by an industrial vehicle, wherein the category defines at least one of electronic measurements of travel of the industrial vehicle, or electronic measurements of load handling of the industrial vehicle; and characterized by a parameter, which is utilized to measure the corresponding activity;

monitors electronic information communicated by a vehicle controller across the vehicle network bus during use of the industrial vehicle;

maps a data type that can be extracted from the industrial vehicle by the information linking device to the parameter that characterizes the category;

extracts actual vehicle usage data from the electronic information monitored across the vehicle network bus, where the vehicle usage data corresponds to the data type that is mapped to the parameter that characterizes the category;

accumulates, into memory, the actual vehicle usage data;

accumulates, into memory, samples corresponding to discharge information measured by a battery monitor, wherein the battery monitor measures a characteristic of a battery of the industrial vehicle, and the measured characteristic is utilized to characterize energy discharged by the battery of the industrial vehicle during a time that the industrial vehicle is engaged in the distinct, measurable activity;

wherein the information linking device computes a weighted impact on work performed by the industrial vehicle as a function of energy consumed in performing that work, based upon a correlation of the accumulated actual vehicle usage data with the accumulated discharge information, wherein the weighted impact on work is expressed as power expended per unit of time; and wherein the weighted impact on work is output to a display that outputs the weighted impact on work performed by the industrial vehicle in performing the distinct, measurable activity;

generating, based on the weighted impact on work, a customized energy profile for the industrial vehicle; and communicating multiple energy profiles, including the customized energy profile, across the vehicle network bus to the display; and configuring the display to display the multiple energy profiles, including the customized energy profile, such that the multiple energy profiles are selectable by the operator.

2. The system of claim 1, wherein:
the display further outputs indicia of an opportunity of improvement based upon curves that correlate the weighted impact on work and a predefined ideal curve, the predefined ideal curve corresponding to an ideal implementation of the distinct, measurable activity performed by the industrial vehicle.

3. The system of claim 2, wherein the predefined ideal curve corresponds to at least one of:
a comparison of the weighted impact on work performed by the industrial vehicle to a measure of an equivalent work performed in a predefined ideal manner that is optimized for efficiency; or
a comparison of the weighted impact on work performed by the industrial vehicle to a measure of an equivalent work performed in a predefined ideal manner that is optimized for energy conservation.

4. The system of claim 1, further comprising:
a battery usage history that stores in memory, the discharge information sampled by the battery monitor;
wherein the weighted impact on work performed by the industrial vehicle comprises a correlation of the measure of power expended per unit of time extracted from the battery usage history to the extracted vehicle usage data.

5. The system of claim 1, wherein the information linking device is further programmed to communicate across the vehicle network bus of the industrial vehicle to communicate with native industrial vehicle components in addition to the vehicle controller to obtain the collected data from the industrial vehicle.

6. The system of claim 1, further comprising:
a transceiver on an industrial vehicle that communicates wirelessly with a remote server;
wherein:
the information linking device is further programmed to:
receive from the remote server via the transceiver, the distinct, measurable activity capable of being performed by the industrial vehicle as a measure of travel distance; and
measure an actual travel distance, where the actual travel distance is the distance traveled by the industrial vehicle while the industrial vehicle is being operated.

7. The system of claim 6, further comprising an odometer that measures the travel distance;
wherein:
the processor is further programmed to measure tire travel by reading the odometer, so as to account for tire slippage in determining travel distance of the industrial vehicle.

8. The system of claim 6, wherein the information linking device is further programmed to measure travel distance by receiving location data from a location tracking system to track the travel of the industrial vehicle within a warehouse.

9. The system of claim 1, further comprising:
a transceiver on an industrial vehicle that communicates wirelessly with a remote server;
wherein:
the information linking device is further programmed to:
receive from the remote server via the transceiver, the distinct, measurable activity capable of being performed by the industrial vehicle as a measure of lift distance; and
measure an actual lift distance, where the actual lift distance is the distance of lift operations performed by the industrial vehicle while being operated.

10. The system of claim 1, further comprising:
a transceiver on an industrial vehicle that communicates wirelessly with a remote server;
wherein:
the information linking device is programmed to:
receive from the remote server via the transceiver, the distinct, measurable activity capable of being performed by the industrial vehicle as a measure of:
travel of the industrial vehicle where the industrial vehicle is traveling with a load;
travel of the industrial vehicle where the industrial vehicle is traveling with no load;
lift operations with a load; and
lift operations without a load.

11. The system of claim 10, wherein the information linking device is further programmed to:
receive from the remote server via the transceiver, the distinct, measurable activity capable of being performed by the industrial vehicle as a measure of blending of travel and lifting into a single operation.

12. The system of claim 11, wherein the information linking device is further programmed to:
receive via the transceiver from the remote server, an assigned static baseline value for the distinct, measurable activity.

13. The system of claim 12, wherein the information linking device is further programmed to:
adjust the static baseline value associated with the distinct, measurable activity by a dynamic value.

14. The system of claim 1, wherein the information linking device is further programmed to:
define a work unit expressed as power expended per unit of time; and
use the work unit to compute a cost associated with each of a plurality of categories, each category associated with a different and unique distinct, measurable activity.

15. The system of claim 14, wherein the information linking device is further programmed to: multiply the total measure by a cost of energy expended per unit time.

16. The system of claim 15, wherein the information linking device is further programmed to:
determine a cost for defined tasks based upon the measure of work for the categories.

17. The system of claim 16, wherein the information linking device is further programmed to:
compare an actual measured cost for a given task to an ideal cost for that task to evaluate the performance of an operator of the industrial vehicle.

18. The system of claim 1, wherein the vehicle controller is a traction controller.

19. The system of claim 1, wherein the vehicle controller is a hydraulics controller.

20. A system for measuring industrial vehicle usage, the system comprising:
an information linking device coupled to a vehicle network bus of an industrial vehicle;
a vehicle controller that communicates electronic information across the vehicle network bus;
a battery monitor that measures a characteristic of a battery of the industrial vehicle, and the measured characteristic is utilized to characterize energy discharged by the battery of the industrial vehicle during a time that the industrial vehicle is engaged in a distinct, measurable activity;
a memory coupled to the information linking device; and
a display coupled to the information linking device;
wherein the information linking device is operatively configured for:
establishing a category that is:
associated with the distinct, measurable activity capable of being performed by the industrial vehicle, wherein the category defines at least one of electronic measurements of travel of the industrial vehicle, or electronic measurements of load handling of the industrial vehicle; and
characterized by a parameter, which is utilized to measure the corresponding activity;
monitoring the vehicle network bus for the electronic information communicated by the vehicle controller;
mapping a data type that can be extracted from the industrial vehicle by the information linking device to the parameter that characterizes the category;
extracting actual vehicle usage data from the electronic information monitored across the vehicle network bus, where the vehicle usage data corresponds to the data type that is mapped to the parameter that characterizes the category;
accumulating, into the memory, the actual vehicle usage data;
accumulating, into the memory, samples corresponding to discharge information measured by a battery monitor;
computing a weighted impact on work performed by the industrial vehicle as a function of energy consumed in performing that work, based upon a correlation of the accumulated actual vehicle usage data with the accumulated discharge information, wherein the weighted impact on work is expressed as power expended per unit of time;
outputting to the display the weighted impact on work performed by the industrial vehicle;
generating based on the weighted impact on work, a customized energy profile for the industrial vehicle;
communicating settings for the vehicle controller based on the customized energy profile; and
configuring the vehicle controller based on the communicated settings.

* * * * *